United States Patent [19]

Engeler et al.

[11] Patent Number: 5,488,588
[45] Date of Patent: Jan. 30, 1996

[54] ULTRASONIC IMAGER HAVING WIDE-BANDWIDTH DYNAMIC FOCUSING

[75] Inventors: William E. Engeler, Scotia; Christopher M. W. Daft, Schenectady, both of N.Y.

[73] Assignee: General Electric Company, Schnectady, N.Y.

[21] Appl. No.: 301,751

[22] Filed: Sep. 7, 1994

[51] Int. Cl.⁶ .................................................. G03B 42/06
[52] U.S. Cl. .................. 367/7; 367/11; 367/103; 128/661.01
[58] Field of Search ............................ 367/11, 103, 105, 367/7; 128/661.01

[56] References Cited

U.S. PATENT DOCUMENTS

| | | | |
|---|---|---|---|
| 4,974,211 | 11/1990 | Corl | 367/7 |
| 5,111,695 | 5/1992 | Engeler et al. | 73/626 |
| 5,172,343 | 12/1992 | O'Donnell | 367/7 |
| 5,228,006 | 7/1993 | Sheriff | 367/103 |
| 5,228,007 | 7/1993 | Murakami et al. | 367/103 |

Primary Examiner—J. Woodrow Eldred
Attorney, Agent, or Firm—Marvin Snyder

[57] ABSTRACT

An ultrasonic imaging system provides dynamic focusing by using dynamic group delay in addition to dynamic phase focus. FIFO memory storage capacity in the beamforming circuit is increased to provide improved resolution of the data samples stored therein. These samples are selected by an address counter in response to both the advance of time and the accumulation of a phase advance clock count. After a Read Start signal, indicating the start of a beam, is supplied to the FIFO memory, the FIFO memory address is advanced, on each read instruction, by the number of address locations corresponding to the period of a pipeline channel. In addition, the address is incremented whenever the accumulated count of a phase advance clock exceeds an amount corresponding to the smallest increment of the data stored in the FIFO memory.

19 Claims, 7 Drawing Sheets

ULTRASONIC IMAGER HAVING WIDE-BANDWIDTH DYNAMIC FOCUSING

FIELD OF THE INVENTION

This invention generally relates to digital baseband imaging systems and, more particularly, to a method and an apparatus for providing dynamic focusing and improved bandwidth in such digital baseband imaging systems.

BACKGROUND OF THE INVENTION

While known digital baseband imaging systems, such as of the ultrasonic imaging type, provide a number of features, their performance is limited by practical system considerations. One such limitation lies in the use of phase focusing. Fine focusing delay and dynamic focusing are provided by phase rotation of the real and imaginary parts of the baseband signal rather than by actual delay of the signal. This method provides an exact solution for narrow-bandwidth signals at the central frequency, but generates errors of increasing magnitude as the bandwidth of the signal is increased.

In digital baseband imaging systems, the radio-frequency signals are converted into digital samples by an analog-to-digital converter. These digital samples then undergo a series of demodulations and filtering to generate a complex signal having in-phase and quadrature components. These operations are carried out separately in each receive channel.

The echo signals reflected from a particular sample arrive at the various transducers at different times. A reception beam from that sample volume is formed by applying precise time delays to the signals received by respective receive channels from the transducer array. Each of these signals is delayed by an amount necessary to form a beam in the given desired direction. This beamforming process is conveniently divided into two parts: the steering function and the focusing function. The steering function is realized by providing the time delay necessary to steer the beam in a given direction $\theta$ with respect to a line normal to the face plane of the transducer array. The focusing function is realized by providing a time-dependent time delay necessary to maintain accurate focus during propagation of the acoustic imaging pulse through the sample. These delays enable the various signals reflected from each point ($R$, $\theta$) to be summed into one coherent summation signal.

The quantization of the beam-steering time delay, however, is limited to the discrete time steps of the analog-to-digital (A/D) converter. In some known systems, the A/D converters operate with a clock frequency of 40 MHz. The time delays are therefore quantized to steps of 25 nsec. This forms a practical limitation of such systems. If selecting the cycle of a common reference clock were the only method for providing time delay, the resulting image would be poor. However, as already mentioned, these systems further employ phase delay to remove the quantization in time restrictions of the A/D converters and to improve the overall image quality.

From the A/D converter, the information for that channel is demodulated to baseband and low-pass filtered. This allows the data rate to be reduced from the rate produced by the A/D converter. A decimation section selects data samples which are then sent to a first-in, first-out memory (FIFO), where they are stored until they are needed by the beam. Fine group delay control is provided through sample selection in the stages prior to storage of the samples in the FIFO. The fine group delay is accompanied by a fine demodulation phase delay. In conventional systems, the FIFO provides only the relatively coarse time delay in increments of the pipeline sample period, and both the demodulation phase and group delay selection are fixed throughout each beam time. Dynamic focusing is provided only through changes in the phase rotation of the I and Q data in the rotator.

Phase rotation of the demodulated and filtered signals is accomplished by vector rotation of the in-phase and quadrature components of the complex signal. This rotation is fixed in time to provide the basic steering or beamforming direction and it is changed in time to provide a dynamic focusing of the received beam. These changes are scheduled by the internally generated phase advance clock (PAC) signals. In these baseband systems, demodulation and group time delays remain fixed throughout the time of the beam. In other systems, real time delays are provided by direct rf sampling and interpolation.

In prior art digital baseband imaging systems having two pipeline channels, two separate phase rotations are performed to provide two separate beams from a single firing of the transducers. The two formed beams are directed relative to each other at different angles. This feature is commonly referred to as two-for-one beamforming. Each channel has its separate schedule of both the initial and the time-dependent phase changes, but both beams utilize the same time-delayed, demodulated and filtered signal. The rotated outputs are separately summed by the left and right pipelines and sent to the system midprocessor for further processing and display.

SUMMARY OF THE INVENTION

One object of the invention is to provide a wide bandwidth vibratory energy imaging system which performs dynamic focusing by using dynamic group delay in addition to conventional dynamic phase focus.

Briefly, in accordance with a preferred embodiment of the invention, the FIFO storage capacity of a digital baseband imaging system is increased to improve resolution of the data samples stored in that structure. These samples are selected by an address counter in response to both the advance of time, as in the usual FIFO, and the accumulation of the PAC count.

After a Read Start signal, which indicates the start of a beam, is supplied to the FIFO, the FIFO address is advanced, on each read instruction, by the number of address locations corresponding to the period of the pipeline. In addition, the address is incremented whenever the accumulated count of the PAC exceeds an amount corresponding to the smallest increment of the data stored in the FIFO.

DETAILED DESCRIPTION OF THE PREFERRED EMBODIMENTS

Figure 1:
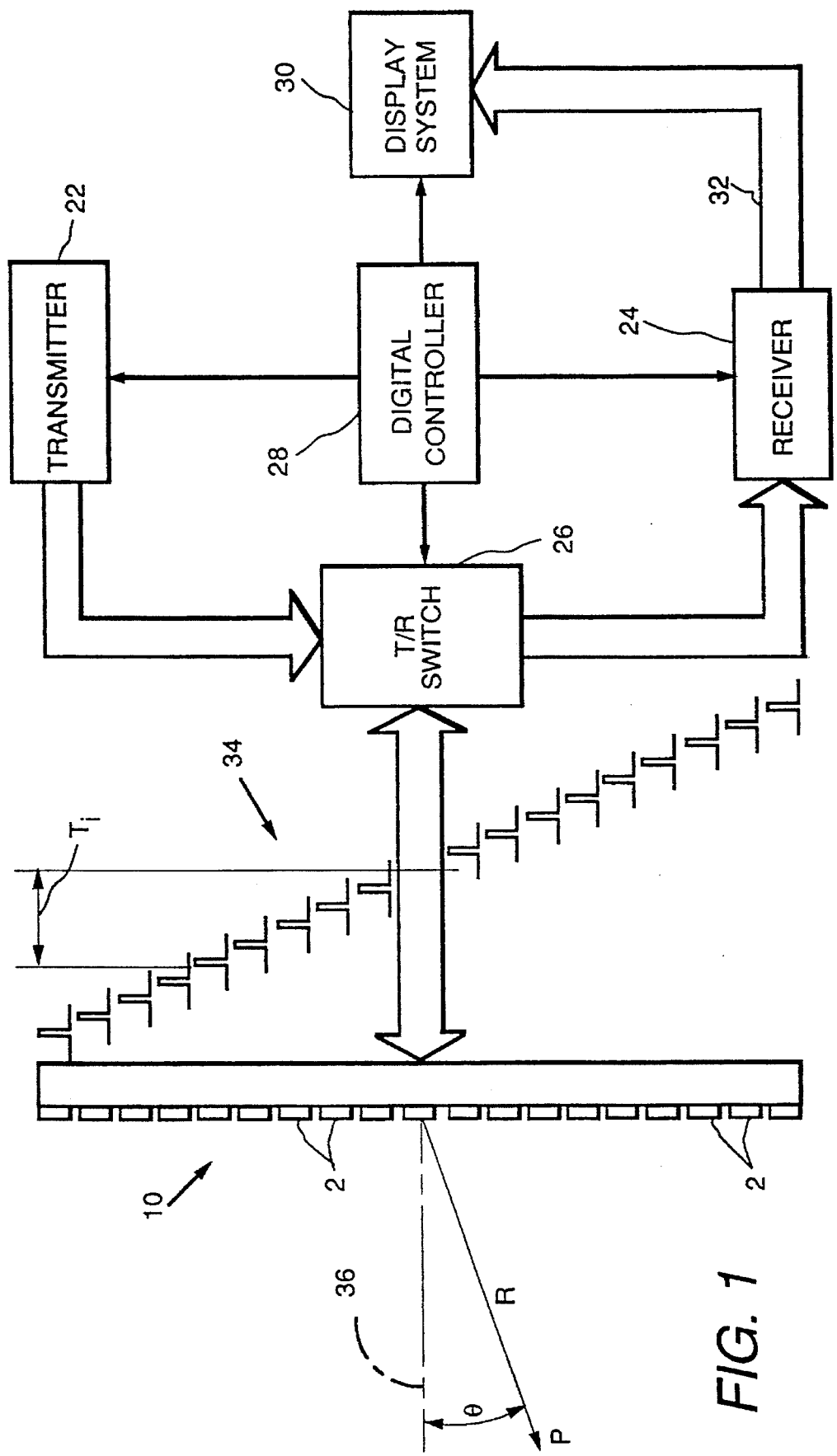
FIG. 1 is a block diagram of a conventional ultrasonic imaging system.

As shown in FIG. 1, an ultrasonic imaging system incorporating the invention includes a transducer array 10 comprised of a plurality of separately driven transducers 2, each of which produces a burst of ultrasonic energy when energized by a pulsed waveform produced by a transmitter 22. The ultrasonic energy reflected back to transducer array 10 from the object under study is converted to an electrical signal by each receiving transducer 2 and applied separately to a receiver 24 through a set of transmit/receive (T/R) switches 26. Transmitter 22, receiver 24 and switches 26 are operated under control of a digital controller 28 responsive to commands by a human operator. A complete scan is performed by acquiring a series of echoes in which switches 26 are set to their transmit positions, transmitter 22 is gated ON momentarily to energize each transducer 2, switches 26 are then set to their receive positions, and the subsequent echo signals produced by each transducer 2 are applied to receiver 24. The separate echo signals from each transducer 2 are combined in receiver 24 to produce a single echo signal which is used to produce a line in an image on a display system 30.

Transmitter 22 drives transducer array 10 such that the ultrasonic energy produced is directed, or steered, in a beam. To accomplish this, transmitter 22 imparts a time delay $T_i$ to the respective pulsed waveforms 34 that are applied to successive transducers 2. By adjusting the time delays $T_i$ appropriately in a conventional manner, the ultrasonic beam can be directed away from axis 36 by an angle θ and/or focused at a fixed range R. A sector scan is performed by progressively changing the time delays $T_i$ in successive excitations. Angle θ is thus changed in increments to steer the transmitted beam in a succession of directions.

The echo signals produced by each burst of ultrasonic energy reflect from objects located at successive ranges along the ultrasonic beam. The echo signals are sensed separately by each transducer 2 and a sample of the magnitude of the echo signal at a particular point in time represents the amount of reflection occurring at a specific range. Due to differences in the propagation paths between a reflecting point P and each transducer 2, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at angle θ.

Figure 2:
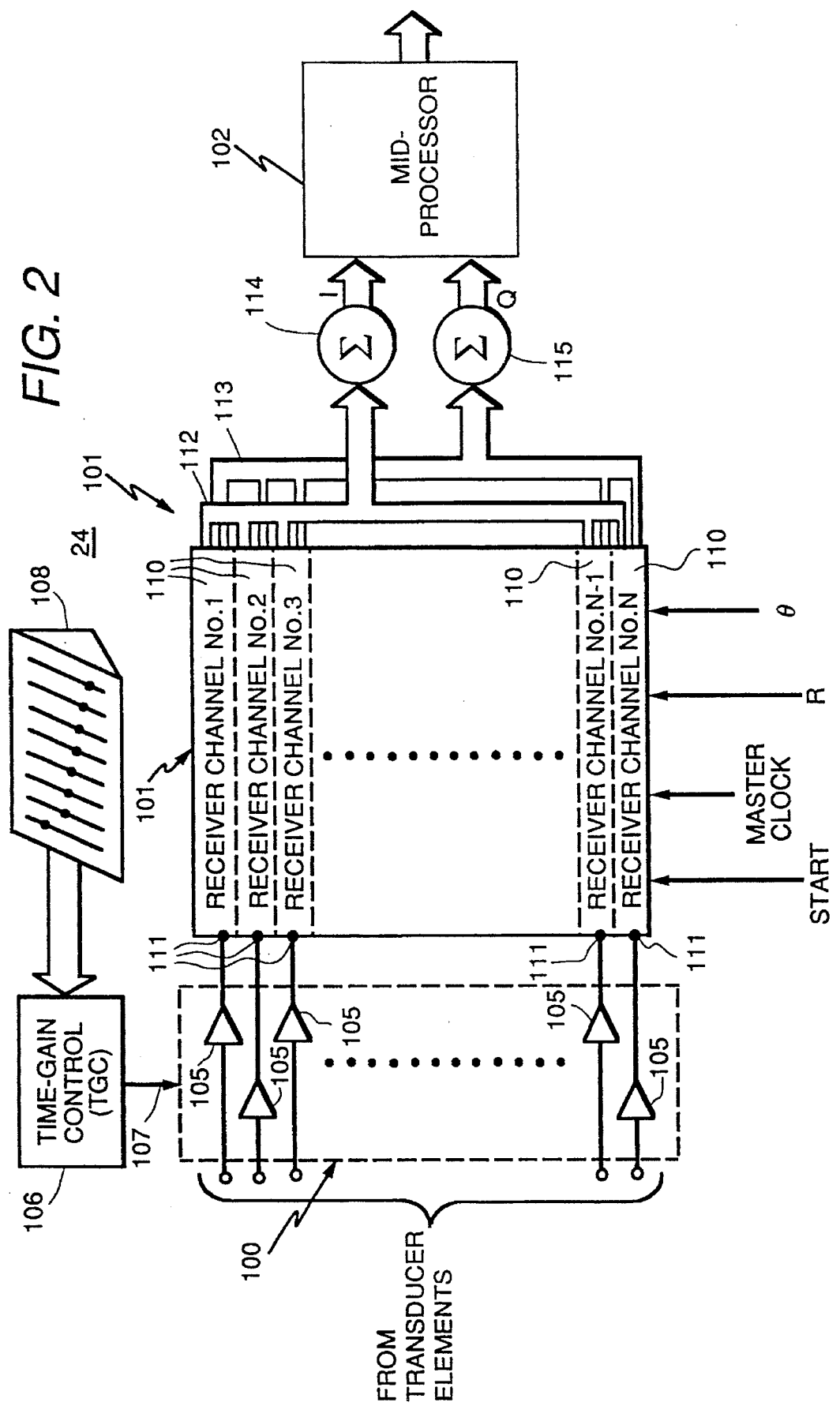
FIG. 2 is a block diagram of a conventional receiver which forms part of the system of FIG. 1.

To simultaneously sum the electrical signals produced by the echoes impinging on each transducer 2, time delays are introduced into each separate transducer channel 110 of receiver 24 (see FIG. 2). The beam time delays for reception are the negative of the transmission time delays when measured from the time of the central element. The time delay of each receiver channel is continuously changing during reception of the echo to provide dynamic focusing of the received beam at range R from which the echo signal emanates.

Under direction of digital controller 28, receiver 24 provides delays during the scan such that steering of receiver 24 tracks the direction θ of the beam steered by transmitter 22 and samples the echo signals at a succession of points P along the beam having ranges R. Thus, each emission of an ultrasonic pulse waveform results in the acquisition of a series of data points which represent the amount of reflected ultrasonic energy from a corresponding series of points P located along the ultrasonic beam. Display system 30 receives the series of data points produced by receiver 24 and converts the data into the desired image.

As shown in FIG. 2, receiver 24 comprises three sections: a time-gain control section 100, a receive beamforming section 101 and a mid-processor 102. Time-gain control (TGC) section 100 includes a respective amplifier 105 for each receiver channel 110, and a time-gain control circuit 106. The input of each amplifier 105 is connected to a respective one of transducers 2 to amplify the echo signal which it receives. The amount of amplification provided by amplifiers 105 is controlled by a TGC circuit 106, which is set by adjustment of potentiometers 108.

The receive beamforming section 101 of receiver 24 includes separate receiver channels 110. Each receiver channel 110 receives an analog echo signal from one of amplifiers 105 at an input 111. Each amplified signal is conveyed to a pair of quadrature detectors in the respective receiver channel, where the phases of a mixing reference frequency differ by 90°. The pair of output signals from a low-pass filter in the receiver channel become complex signals (I and Q) with phases that differ by 90°. These signals are produced as a stream of digitized output values at baseband on an I bus 112 and a Q bus 113. Each of these I and Q baseband signals represents a demodulated sample of the echo signal envelope at a specific range R. These samples are delayed such that when they are summed at summing points 114 and 115 with the I and Q samples from each of the other receiver channels 110, the summed signals indicate the magnitude and phase of the echo signal reflected from point P located at range R on the beam steered at angle θ.

While summing points 114 and 115 are shown in FIG. 2 as discrete summers, the summation is typically provided by a combination of summing and delay structures. Conventional systems may, for example, employ a pipeline architecture for this purpose. In that architecture the information from each channel is added to sum at its summing structure. This summed information is then delayed and used in the summation of the following channel. Delays introduced by the pipeline are in steps of the pipeline clock period and may therefore be compensated by the delays provided by the FIFO of each channel. In addition, the summation may be grouped into partial sums, properly delayed by similar periods and summed into a final pipeline. Details of these architectures are dependent on the design considerations of the system designer. In all instances, the architectures provide the function of summing the information from each range position common to each channel. The term "summation channel" as used herein encompasses all variations of pipeline and non-pipeline summations.

The mid-processor section 102 receives the beam samples from summing points 114 and 115. The I and Q values of each beam sample are signals representing the in-phase and quadrature components of the magnitude of the reflected sound from a point (R, θ).

Figure 3:
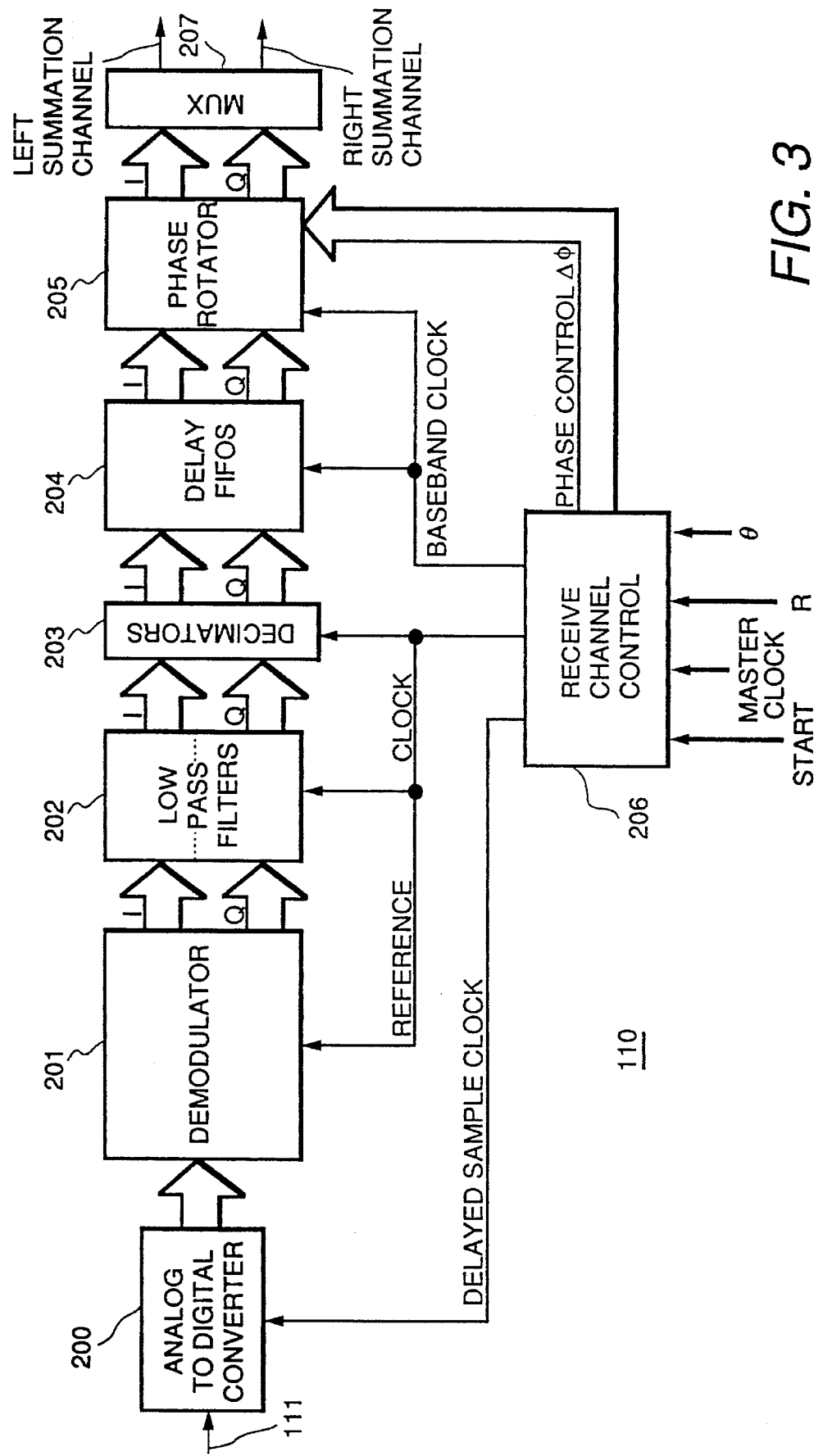
FIG. 3 is a block diagram of a conventional receiver channel which forms part of the receiver of FIG. 2.

Referring to FIG. 3, each receiver channel is responsive to a START command, a master clock, and a beam angle signal (θ) from digital controller 28 (FIG. 1) to perform the digital beamforming functions, which include: sampling the analog input signal 111 in an analog-to-digital converter 200; demodulating the sampled signal to baseband in a demodulator 201; filtering out the high-frequency sum signals produced by demodulator 201 with low pass filters 202; reducing the data rate and providing a time delay in steps of the period of the sampling clock in decimators 203; providing a time delay in steps of the reduced data rate in FIFOs 204; and phase adjusting the resulting digital data stream in phase rotator 205. Receiver channel elements 200–205 are controlled by a receive channel control 206 which produces the required clock and control signals in response to commands from digital controller 28 (FIG. 1).

The analog-to-digital converter 200 samples the analog signal at regular intervals. These samples are provided to demodulator 201, which mixes each sample with both a reference signal that is in-phase with, and a reference signal that is in quadrature with, the transmitted ultrasonic carrier. The demodulator reference signals are produced from stored SINE and COSINE tables that are read out of respective read-only memories (ROMs) from receive channel control 206. The SINE value is digitally multiplied by the sampled input signal to produce a demodulated, in-phase I output signal that is supplied to one portion of low pass filters 202, and the COSINE value is digitally multiplied by the same sampled input signal to produce a demodulated, quadrature phase Q output signal to a separate portion of low pass filters 202. Low pass filters 202 are finite impulse response (FIR) filters designed to pass the baseband frequency, but block the higher sum frequencies supplied by demodulator 201. The output signal of each portion of low pass filters 202 is a stream of digital values which indicate the magnitude of the I or Q component of the echo signal envelope.

The rate at which the demodulated I and Q components of the echo signal are sampled is reduced by decimators 203, which also provide a delay in steps (i.e., fractions) of the period of the sampling clock. The echo signal envelope represented by the demodulated and decimated digital samples is then delayed in steps of the reduced data rate by delay FIFOs 204 and phase-shifted by phase rotator 205 to provide the desired beam steering and beam focusing.

In the two-for-one beamforming mode, two separate phase rotations are performed by phase rotator 205 to provide two separate beams from a single firing of the transducers. The two formed beams are phase-rotated relative to each other. The phase-rotated output signals are multiplexed in a multiplexer 207 to the left and right summation channels.

Figure 4:
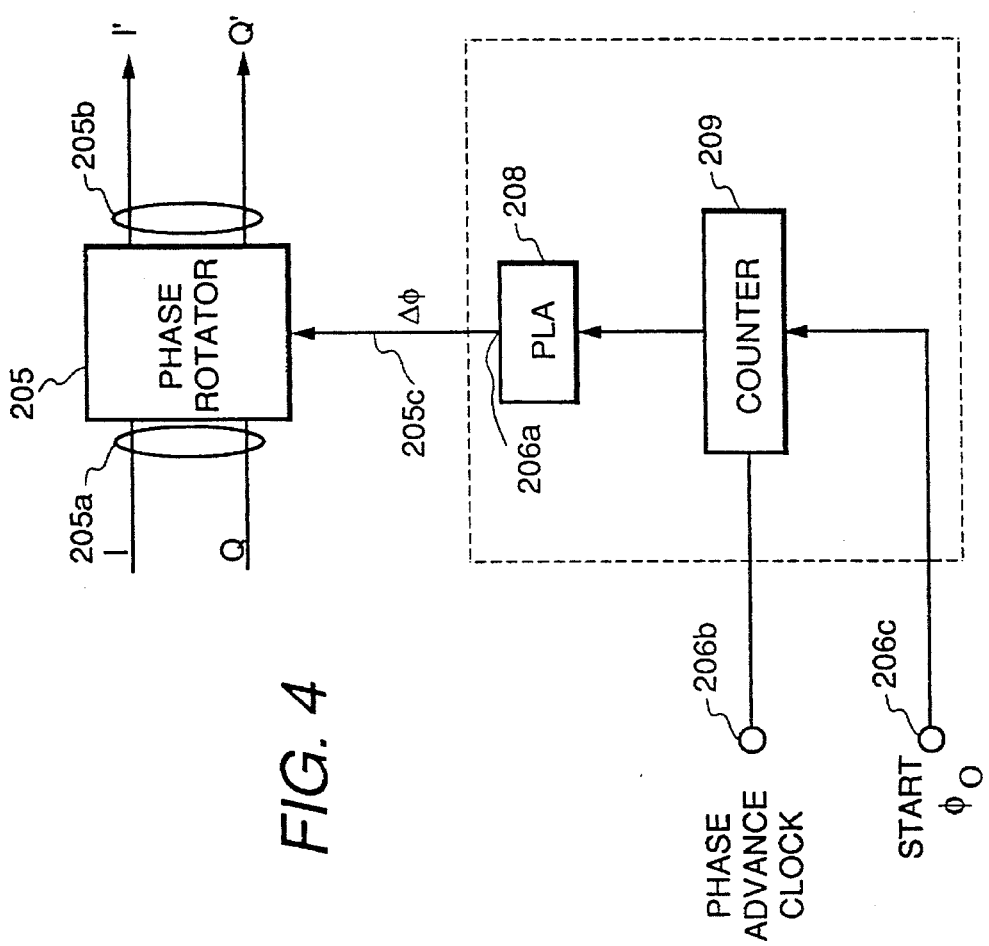
FIG. 4 is a block diagram of a conventional phase rotator with a phase rotation control circuit.

As shown in FIG. 4, the filtered in-phase I baseband data and the quadrature-phase Q baseband data are separately provided to respective inputs 205a of a Cordic phase rotator 205. Phase rotator 205 causes fine phase rotation (and therefore fine time-delay adjustment) of the two signals to provide a finely adjusted in-phase I' baseband data and finely adjusted quadrature-phase Q' baseband data at outputs 205b in response to fine phase rotation control data in steps $\Delta\phi$ provided at a rotator input 205c. Cordic phase rotator 205 may take the form of the Cordic complex multiplier disclosed in O'Donnel and Engeler U.S. Pat. No. 4,896,287, issued Jan. 23, 1990 and assigned to the instant assignee. The disclosure of Pat. No. 4,896,287 is incorporated by reference herein.

The fine phase rotation control data in steps $\Delta\phi$ are provided at output 206a of a programmable logic assembly (PLA) means 208 (e.g., a ROM) incorporated in receive channel control section 206. Control section 206 further incorporates a counter 209, which receives an initial phase rotation $\phi_o$ at a first input 206c and receives a phase advance clock (PAC) signal at a second input 206b. PLA 208 provides control signal information to phase rotator 205 relating to the angle clock information provided by counter 209.

In accordance with the Cordic phase rotation circuit, the delay time in the j-th channel, having a transducer offset from the array centerline by a distance $x_j$, for focusing the reception beam at a range R and at a steering angle θ, has a delay difference from the central transducer given by:

$$t_{dj}=(-x_j/V_s)\sin\theta-(x_j^2/2RV_s)\cos^2\theta \qquad (1)$$

where $V_s$ is the velocity of sound in the sample. The first term in Eq. (1) is the channel time delay necessary to steer the beam to the angle θ, while the second term is the channel dynamic focusing term. Thus the time delay of each channel j is provided by first specifying the time or, more specifically, the number of cycles of a master clock at which the baseband demodulation starts, and also by specifying the rotation angle $\Delta\phi$ by which I and Q are to be phase rotated to provide a fine time-delay adjustment. This recognizes that the total delay time is approximately equal to the product of a time-delay index and a time increment $\Delta t_0$:

$$t_{dj}=k_{dj}\Delta t_0 \qquad (2)$$

But since $\Delta t_0=\Delta\theta/\Omega_0$, Eq. (1) can be written as:

$$k_{dj}=(-x_j/V_s\Delta t_0)\sin\theta-((x_j^2/2RV_s\Delta t_0)\cos^2\theta \qquad (3)$$

A range clock index n is defined such that $2R=nV_s\tau_0$, where $\tau_0$ is the range clock time interval. Then two constants $S_0$ and C are defined as follows:

$$S_0=-X_j\sin\theta/V_s\Delta t_0 \qquad (4)$$

$$C=x_j^2\cos^2\theta/V_s^2\tau_0\Delta t_0 \qquad (5)$$

When the channel is open for use, and in the dynamic focusing situation, only if:

$$\partial k_{dj}/\partial n=-C/n^2=-1 \qquad (6)$$

and with $n=n_0$ so that the constant C is itself equal to $n_0^2$, the time delay index equation becomes:

$$k_{dj}=S_0+C/n-S_0+n_0^2/n \qquad (7)$$

where $n_0$ is the starting range clock index. Thus, focusing time delay corrections are to be made only by adjusting the phase rotation angle $\Delta\phi$ while the vibratory energy pulse is propagating through the sample. This may be conveniently done by sequencing through a set of pre-specified equally spaced rotational angles in steps of $\Delta\phi$ using phase rotator 205, PLA control means 208 and counter 209. This circuitry provides the fine phase control/time delay adjustment needed to provide a phase adjustment $\Delta\phi$ proportional to the dynamic focus time delay index $n_0^2/n$.

In operation, counter 209 is preloaded with the initial starting angle $\phi_0$ data and is then sequenced through its range responsive to the cycles of a PAC signal. The present angle data is sent from counter 209 to the input of PLA 208, which in turn specifies the $\phi$ control signal used by phase rotator 205 so that the total rotation of the I and Q signals is advanced by a specific angle $\Delta\phi$ each time the PAC cycles. Thus, the delay count that is supplied at the start of each beam includes not only those clock counts necessary for θ steering, but also includes the counts necessary to focus the beam at an intermediate distance $R_{mid}$, which midrange is selected, for each channel, to minimize the total delay error. Steps of an angle $\Delta\phi$ of $2\pi/32$ are sufficiently fine to provide adequate focusing while still maintaining reasonable clock rates for apertures corresponding to an f2 lens. Therefore, the frequency control clock can have, at most, the same frequency as the system sample rate; in the extreme case, the focus will change by one step for each sample. The time delay index equation can then be rewritten as:

$$k_{dj} = K_0 - n_0^2(1/n_0 - 1/n) \quad (8)$$

where $K_0$ is the value of the time delay index at $n=n_0$. Therefore, only that j-th channel which meets the range clock criteria is turned on when the count equals $n_0$. At all later times the PAC is cycled whenever the time delay index is increased by one count, i.e., whenever there is an integer solution to Eq. (8). If the occurrence of such integer solutions is counted with an index m, the number of counts $\Delta(m)$ of the range clock between integer solutions is given by:

$$\Delta m = n/(n_0 - 1 - m) \quad (9)$$

Eq. (9) is solved utilizing the data flow of FIG. 5.

Figure 5:
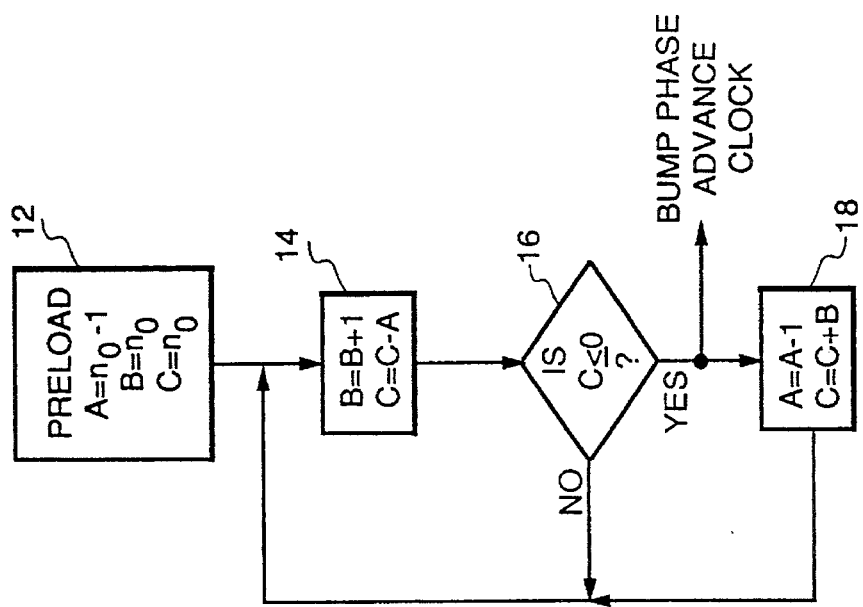
FIG. 5 is a logic flow diagram of a conventional phase advance control algorithm.

In FIG. 5, quantities A, B and C are integer counts which are preloaded into registers. The preloaded values are $A=n_0-1$, $B=n_0$ and $C=n_0$, respectively. After being preloaded at step 12, step 14 is performed and, at each cycle of the range clock, the quantity B is incremented by unity (i.e., B=B+1) and quantity C is decreased by the value of quantity A (i.e., C=C−A). When the new value of quantity C is less than or equal to zero, as checked in a comparison step 16, a PAC cycle request is issued and the PAC is "bumped". This advances the phase rotation of the channel by one step and increases the effective channel delay. The value of quantity A is decreased by one and the value of quantity C is increased by the current value of quantity B, at step 18, and the steps are then repeated on subsequent range clock cycles. Conversely, if the conditional quantity C test at step 16 is not met, no further action is taken until the next range clock cycle, when step 14 is again performed prior to step 16 testing.

The present invention improves upon the foregoing prior art system by providing dynamic focusing using dynamic group delay in addition to conventional dynamic phase focus. One preferred embodiment of the invention is schematically depicted in FIG. 6.

Figure 6:
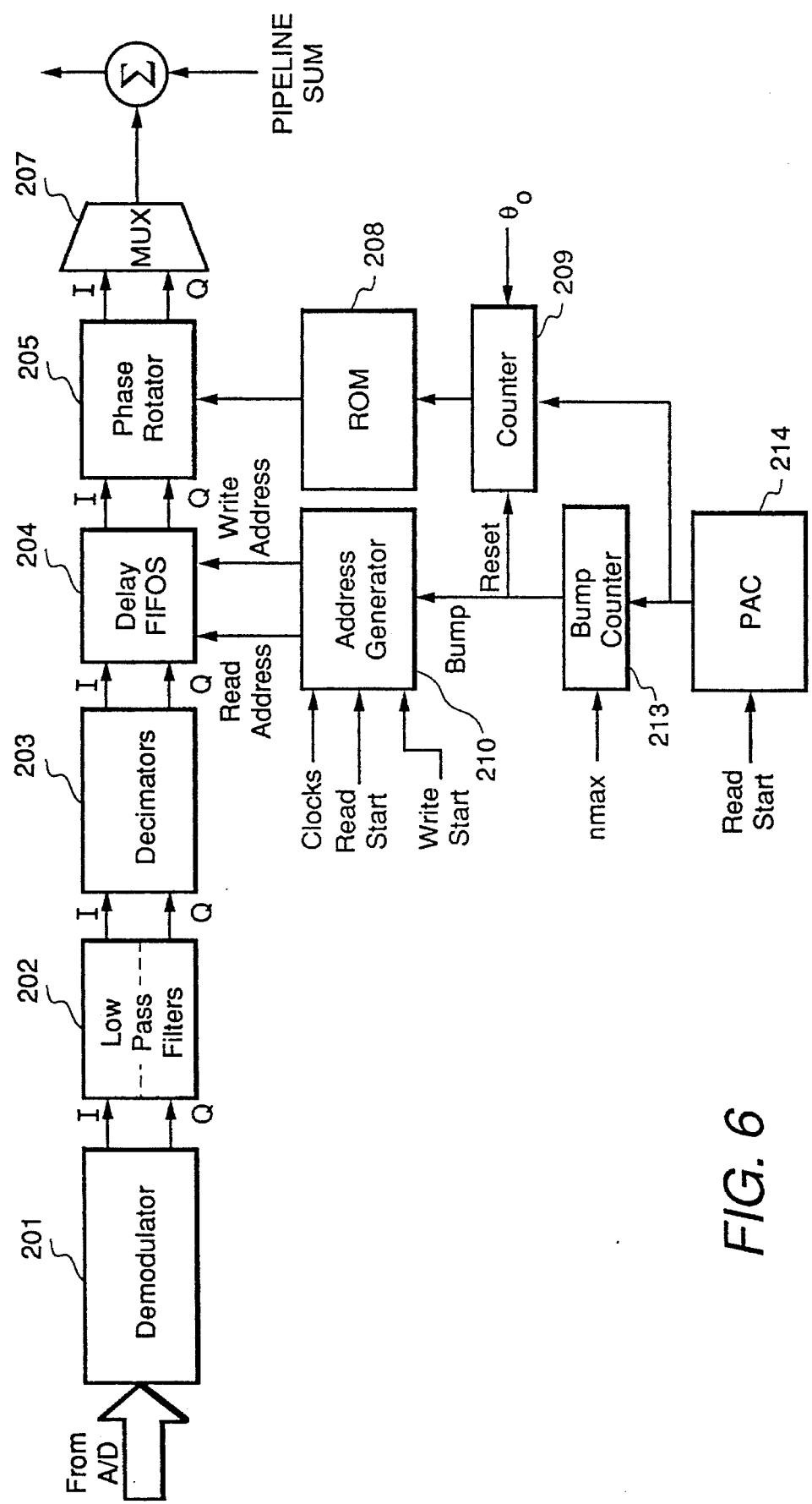
FIG. 6 is a block diagram of the beamforming circuits of an ultrasonic imager in accordance with one preferred embodiment of the present invention.
Figure 7A:
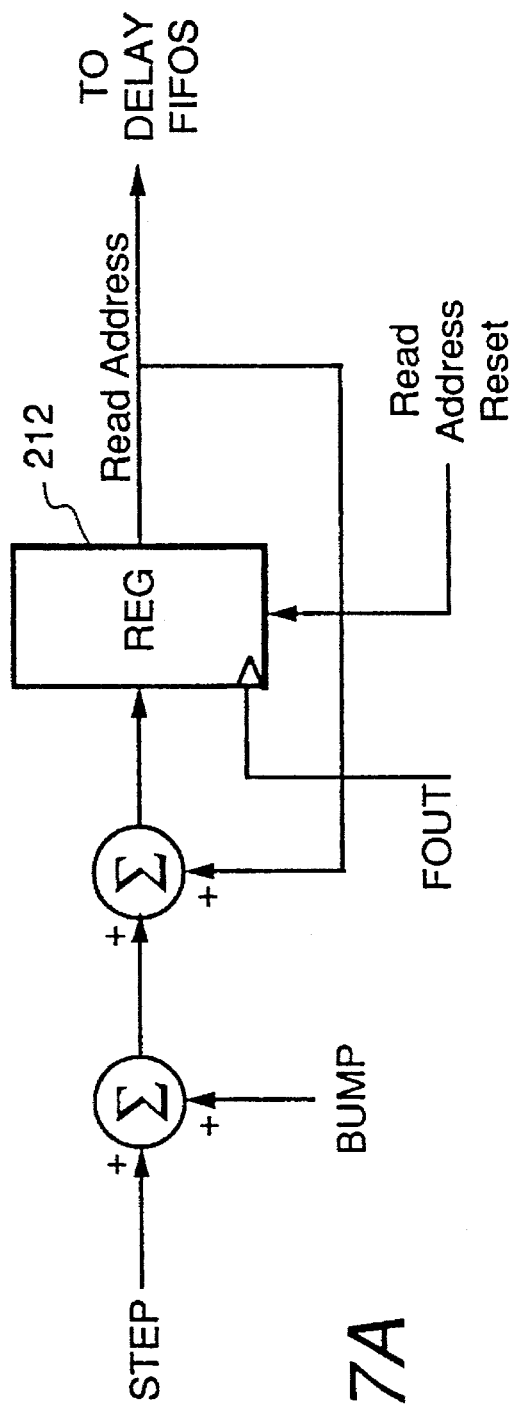
FIGS. 7A and 7B are block diagrams of the address generator circuits that generate the read and write addresses respectively for the FIFO incorporated in the beamforming circuits shown in FIG. 6.
Figure 7B:
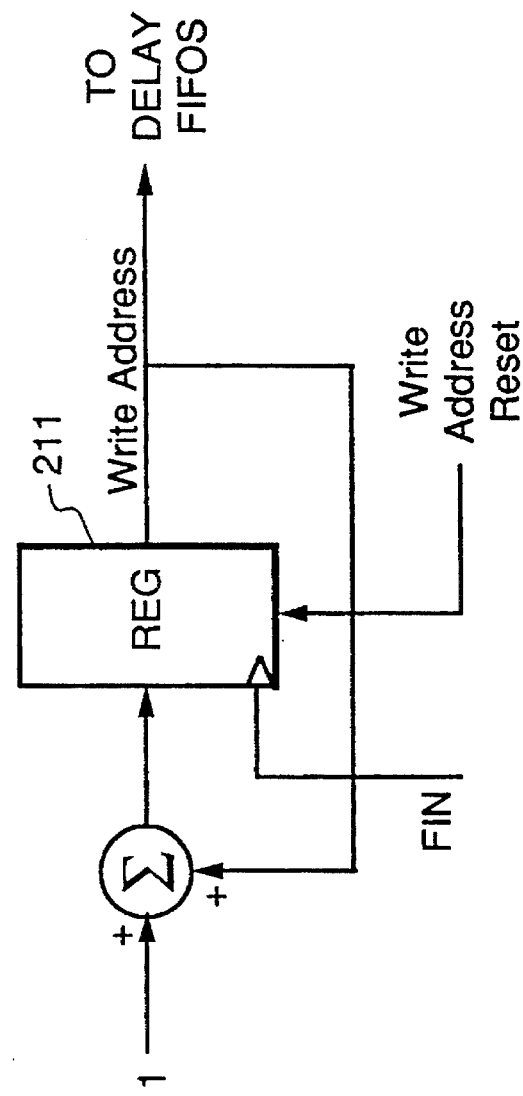

As shown in FIG. 6, the data received by each receiver channel are passed along the signal processing chain to delay FIFOs 204, which are addressed by an address generator circuit (AGC) 210. (Details of the AGC are shown in FIGS. 7A and 7B.) The samples are loaded sequentially into the delay FIFOs starting with address "0". A preselected sample is stored at that location. This sample is selected by the overall delay required by the channel to form the desired beam. This selection is communicated by the timing of a rising edge of a Write Start signal supplied to an address generator circuit 210.

Successive samples are loaded into successive addresses of the delay FIFOs using the Write Address generating circuit shown in FIG. 7B. The rate of this operation is set by an input clock FIN. This clock rate is an integer fraction multiple of the rate of the signal processing chain. Therefore all, or every other, or every fourth, etc., sample is stored in the delay FIFOs, depending on the ratio. This operation is therefore part of the decimation function. The rate that is selected for use is determined as a design compromise of the system. This compromise trades off size of the delay FIFOs against maximum group delay error.

As each sample is written to delay FIFOs 204, a write address counter 211 is advanced by one count. At a later time, set by a Read Start signal, the stored samples are read from the delay FIFOs (FIG. 6) by an address generator 210, starting at address "0", which is the range zero sample of that channel. The range zero sample of that channel is combined with all of the other range zero samples from the other channels to form the coherent sum image.

Successive samples are used in forming the image at successive ranges. The rate that these samples are read from the FIFO is set by a clock, FOUT (FIG. 7A). This clock functions at the output pipeline rate, which is an integer fraction multiple of the FIN clock rate. As each sample is read, a read address counter 212 is advanced by an amount equal to the ratio of the rates of the FIN clock to the FOUT clock. On the cycles when the Bump signal is high (see FIG. 6), the read address is advanced by one additional count. These operations insure that subsequent range samples have a group delay that is accurate to one-half the period of the FIN clock throughout the full range of the imager. This is referred to as dynamic group delay.

The bump signal results from underflow of a bump counter 213, shown in FIG. 6. This counter is a down counter that issues a bump signal whenever the count of pulses from a phase advance clock (PAC) circuit 214 reaches a value $n_{max}$. The same bump signal is used to reset counter 209 to the initial or starting phase rotation angle $\phi_o$.

Phase rotator 205 ensures that the phase delay of the data is accurate to 1/32 of the period of the demodulation frequency. This is done by first setting the phase rotator to an angle $\phi$ corresponding to the angle needed to supplement the quantized delay steps of the A/D samples and then adjusting that angle so that the phase remains correct during the focusing of the receiver, to different depths, as the ultrasonic pulse moves through points P located at ranges R along the ultrasonic beam oriented at angle $\theta$ (as shown in FIG. 1). This is called dynamic phase focus.

For example, assume that the pipeline rate is 5 MHz and the FIFO storage corresponds to samples taken at a 20 MHz rate. Assume also that the transducer operates with a center frequency of 7.5 MHz. The FIFO address is advanced at each count of the 5-MHz clock by 4. The PAC generates clock counts, also on a 5 MHz time grid, whenever the requisite conditions in the flow diagram of FIG. 5 are satisfied. Each count advances counter 209 and the phase rotation by one step $\Delta\phi$ (1/32 of the period of the center frequency of the transducer). The count also advances the accumulated downcount in bump counter 213. When this count equals $n_{max}$, the read address count is incremented by unity. In this example, $n_{max}$ is 12, corresponding to the ratio of the stored sample period to the equivalent time delay of one step of phase rotator 205. The intermediate distance range $R_{mid}$ is set so that exact group delay is achieved at a bump counter count of 6 to minimize the error. This group delay is never more than 6 counts from the ideal delay.

Both accurate dynamic phase focus and accurate dynamic group delay focus are required if highly accurate widebandwidth beamforming is to be achieved. In practice, however, some errors are unavoidable. Allocating these errors represents some of the system design trade-offs. The phase error is more important than the group delay error. This is due to the larger center frequency of the pulse compared to the bandwidth of the pulse and to the pulse shape factor. The time interval grid of the samples stored in the FIFO is therefore much coarser than that of the phase rotation.

The initial angle and the phase adjustments are each set to one of the 32 phase rotation positions of phase rotator 205. The phase angle starts at the position corresponding to initial starting angle $\phi_0$ and is advanced by one step when the PAC signal is issued. This may take place as often as once per cycle of the output clock FOUT. The PAC signal is initiated at the start of the FIFO read period. When $n_{max}$ of these signals have been issued, the phase rotator is again reset to $\phi_0$ by the bump signal.

In general, the circuits discussed herein are implemented in pipeline fashion with register delays introduced between active functions. The signals acting upon stages later along the pipeline must therefore be delayed so that their action takes place on the correct sample. This is well known in the art. To simplify this explanation of the invention, the diagrams of FIGS. 6, 7A and 7B do not reflect these delays but instead are treated as concurrent actions.

FIGS. 7A and 7B illustrate the details of FIFO address generator 210 (see FIG. 6). Read Address register 212 is reset when the Read Start signal is low, and Write Address register 211 is reset when the Write Start signal is low. The generated addresses act preferably on a dual-port memory, so that the read and write functions may act simultaneously and independently. When the desired speed can be achieved a single-port memory may alternatively be used, in which instance the cycle is divided into read and write portions.

FIGS. 6, 7A and 7B show the invention implemented by parallel I and Q channels through the pipeline. At the pipeline output, these data are multiplexed in multiplexer 207 to limit the number of output pins needed by the integrated circuit chip on which the pipelines are implemented. In an alternative embodiment an additional beam may be formed at the same time as the first beam by phase-rotating the data through an additional angle. In this instance, a second counter (not shown) sets a second phase rotator (not shown) to an angle offset from the initial starting angle $\phi_0$. The action of this second counter is the same as that of the first except that upon reset it is returned to a phase angle of $\phi_0$+the offset angle. This is referred to as a two-for-one mode of operation. The conventional two-for-one mode is presently used in conjunction with dynamic phase focus without dynamic group delay focus.

A further preferred embodiment of the invention utilizes the second pipeline not to provide an additional beam, but rather to increase the rate of data output by providing additional data samples along the same beam direction. These samples are selected at the FIFO by incrementing the address by one half of the amount that it is advanced on each clock cycle. In this case the left pipeline is used for the Q data and the right pipeline is used for the I data. In this way the pipeline rate is increased from 5 to 10 MHz, for example. Systems may be designed that allow functioning in either of these modes depending on the desires of the operator.

Figure 8:
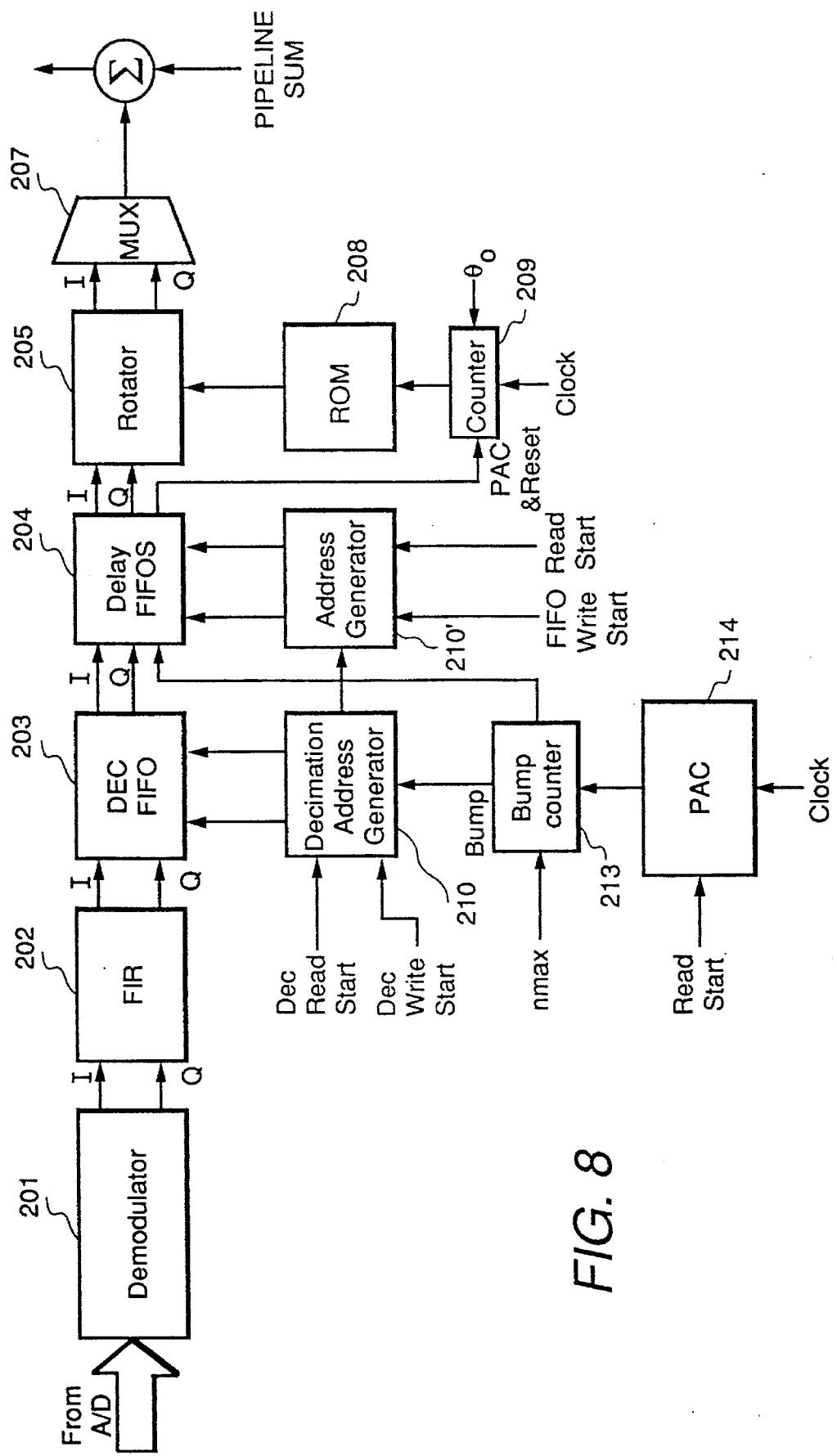
FIG. 8 is a block diagram of the beamforming circuits of an ultrasonic imager in accordance with another preferred embodiment of the present invention.

In accordance with a further modification, only those samples that will be used in the final pipeline of the system are stored in the FIFO. This requires the PAC generator to function prior to sample storage, so that sample selection may be made before the sample is stored, and also requires that the PAC signal used in the sample selection be stored in the FIFO. The increased complexity of the control circuits required to accomplish these tasks results in reduced FIFO size. As shown in FIG. 8, this can be accomplished by moving PAC generator 214 ahead of delay FIFOs 204'. This allows selection and storage of only those samples that are to be used in later processing. In the embodiment of FIG. 8, the PAC is initiated by the start of the write operation of delay FIFOs 104'. Samples are decimated fully prior to their storage in delay FIFOs 204'. The FIN and FOUT clocks are therefore the same as in the embodiment of FIGS. 6, 7A and 7B. This reduces the size of delay FIFOs 204'. The output sample selection at a decimation FIFO 203' is shifted by one whenever the bump signal is issued. The PAC and bump signals are stored in delay FIFOs 204' to provide timing for the dynamic phase focus and reset of phase rotator 205.

Decimation FIFO 203' functions in the same manner as delay FIFOs 204 of FIG. 6, except that its total storage size is much reduced. Decimation FIFO 203' provides only the buffer memory necessary to store the samples required by the sequence of bump signals, and the addressing circuits of decimation FIFO 203' are identical to those of delay FIFOs 204 in the embodiment of FIG. 6. Decimation FIFO 203' is much shorter in storage length than delay FIFOs 204, however, and must be only just longer than the maximum number of bump signals issued for any beam. Decimation FIFO 203' provides a portion of the total delay required by the channel for that beam, while the remainder of the delay is provided by storage in delay FIFOs 204' in the usual manner.

The decimation FIFO 203' input and output clocks DFIN and DFOUT, respectively, (not shown) reflect the differences between the rate of the samples being stored and the output rate, just as the differences between clocks FIN and FOUT reflect these differences in the embodiment of FIG. 6. DFOUT, FIN, FOUT and the output pipeline, in the embodiment of FIG. 8, are all at the same rate. The decimation address generator 210 is therefore of configuration similar to that shown in FIGS. 7A and 7B, with these clock designation changes. The ratio of clock rate DFIN to clock rate DFOUT sets the step size of the read address counter in decimation address generator 210. This is advanced by one count when the bump signal is issued. Decimation Read Start signals applied to the decimation FIFO 203' and FIFO Write Start signals applied to delay FIFOs 204' are the same (except for fixed pipeline delays).

The final one of FIFO 204s' is addressed by AGC 210' and provides the remainder of the delay, storing only those samples that are required for output processing. This combination reduces the total circuit size of the system and facilitates a design compromise between size and group delay performance. This final embodiment may be used in conjunction with the two-for-one and dual-mode output pipeline described above.

While only certain preferred features of the invention have been described herein, many modifications and changes will be readily apparent to those skilled in the art. For example, although a linear array of transducers has been described herein, transducers of other geometries, e.g., multiple rows or annular rings of transducer elements, could be utilized with the present invention. It is, therefore, to be understood that the appended claims are intended to cover all such modifications and changes as fall within the true spirit of the invention.

What is claimed is:

1. A digital baseband imaging system comprising:
   a plurality of transducers arranged in a sequence form an array;
   means for selectively operating said transducers in a transmission mode to produce propagating energy pulses from electrical driving signals; and
   means for forming a beam from analog electrical detection signals produced in response to detection of reflected pulses by said transducers operating in a reception mode, said beamforming means comprising a plurality of receive channels, each receive channel being coupled to a corresponding one of said plurality of transducers, wherein each of said receive channels comprises:

analog-to-digital conversion means for converting said analog electrical detection signals into digital signal samples;

demodulation means for basebanding said digital signal samples to form complex samples;

filter means for filtering said complex samples;

selecting means for dynamically selecting complex samples to provide dynamic group delay of said filtered complex samples; and phase rotating means for dynamically rotating the phase of said selected complex samples to provide dynamic phase focus of said selected complex samples.

2. The digital baseband imaging system as defined in claim 1, further comprising a phase advance clock generator for producing phase advance clock signals, said selecting means and said phase rotating means being responsive to said phase advance clock signals produced by said phase advance clock generator.

3. The digital baseband imaging system as defined in claim 2, wherein said selecting means comprises a first FIFO memory, means for generating read and write addresses for said first FIFO memory, counting means for counting said phase advance clock signals, and means for bumping said read address by a predetermined number in response to a predetermined count in said counting means.

4. The digital baseband imaging system as defined in claim 1, wherein said phase rotating means for dynamically rotating the phase of said selected complex samples comprises a phase rotator, a ROM and a counter, said digital baseband imaging system further comprising a second FIFO memory having inputs connected to outputs of said first FIFO memory and having outputs connected to said inputs of said phase rotating means and additional outputs connected to said counter, said second FIFO memory being adapted to store said phase advance clock signals and said bump signals and to supply the stored phase advance clock signals and the stored bump signals to said counter.

5. The digital baseband imaging system as defined in claim 1, further comprising means for summing phase-rotated complex samples from said plurality of receive channels.

6. The digital baseband imaging system as defined in claim 3, wherein said filter means supplies filtered complex samples to said first FIFO memory at a rate which is an integer fraction multiple of the sampling rate for said complex samples such that said complex samples are decimated when loaded into said first FIFO memory.

7. The digital baseband imaging system as defined in claim 6, wherein the filtered and decimated complex samples are supplied from said first FIFO memory at a rate which is an integer fraction multiple of the rate at which the filtered complex samples are supplied to said first FIFO memory.

8. The digital baseband imaging system as defined in claim 7, including address generator means comprising a read address counter coupled to said first FIFO memory, said read address counter being advanced by an amount equal to the ratio of said input rate to said output rate.

9. The digital baseband imaging system as defined in claim 8, wherein said read address counter is advanced by one additional count in response to a bump signal from said means for bumping said read address.

10. The digital baseband imaging system as defined in claim 8, wherein said phase rotating means is reset to an initial phase angle in response to said bump signal from said means for bumping said read address.

11. A beamforming method comprising the steps of:

selectively operating a plurality of transducers in a transmission mode to produce propagating energy pulses from electrical driving signals;

forming a beam from analog electrical detection signals produced in response to detection of reflected energy pulses by each transducer operating in a reception mode;

converting said analog electrical detection signals into digital samples;

basebanding said digital samples to form complex samples;

filtering said complex samples;

dynamically selecting complex samples to provide dynamic group delay of said filtered complex samples; and dynamically rotating the phase of said selected complex samples to provide dynamic phase focus of said selected complex samples.

12. The method as defined in claim 11, further comprising the step of generating phase advance clock signals, wherein the steps of dynamically selecting complex samples and dynamically rotating the phase of said selected complex samples are performed in response to the generated phase advance clock signals.

13. The method as defined in claim 12, wherein the step of dynamically selecting complex samples comprises supplying said complex samples to a FIFO memory, generating sequential read and write addresses for said FIFO memory, counting said phase advance clock signals to form a phase advance clock count, and bumping said read address by a number determined in accordance with bump signals produced in response to a predetermined phase advance clock count.

14. The method as defined in claim 13, further comprising the steps of storing said phase advance clock signals and said bump signals to provide timing for the dynamic phase focus and to reset the phase of said selected complex samples to an initial phase angle, respectively.

15. The method as defined in claim 11, further comprising the step of summing the phase-rotated complex samples derived from said plurality of transducers.

16. The method as defined in claim 13, wherein the filtered complex samples are supplied to said FIFO memory at a rate which is an integer fraction multiple of the sampling rate for said complex samples, said complex samples being decimated when loaded into said FIFO memory.

17. The method as defined in claim 16, wherein filtered and decimated complex samples are supplied from said FIFO means at a rate which is an integer fraction multiple of the rate at which said filtered complex samples are loaded into said FIFO memory.

18. The method as defined in claim 17, wherein the step of generating sequential read addresses for said FIFO memory is performed by supplying a count which is advanced by an amount equal to the ratio of said input rate to said output rate.

19. The method as defined in claim 18, wherein the phase of said selected complex samples is rotated by an angle equal to an initial phase angle plus an integer number of phase increments equal to or greater than zero.

* * * * *